Dec. 11, 1962  HANS-JOACHIM M. FOERSTER ETAL  3,067,632
CHANGE-SPEED TRANSMISSION
Filed April 27, 1959
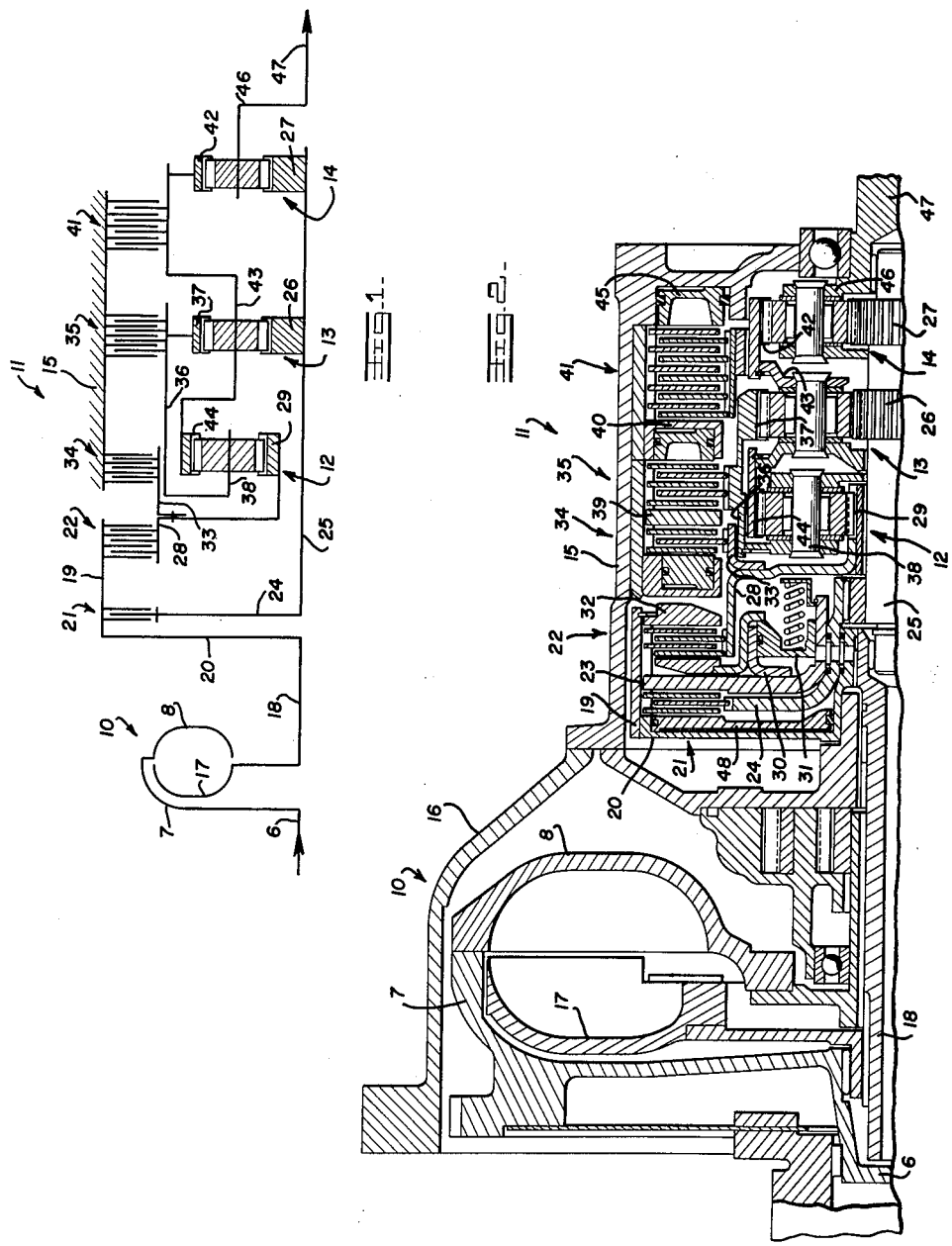
INVENTORS
HANS-JOACHIM M. FOERSTER
WERNER R. E. HENSEL
BY
Dicke, Craig and Freudenberg
ATTORNEYS

United States Patent Office 3,067,632
Patented Dec. 11, 1962

3,067,632
CHANGE-SPEED TRANSMISSION
Hans-Joachim M. Foerster, Stuttgart-Bad Cannstatt, and Werner R. E. Hensel, Fellbach, near Stuttgart, Germany, assignors to Daimler-Benz Aktiengesellschaft, Stuttgart-Unterturkheim, Germany
Filed Apr. 27, 1959, Ser. No. 809,087
Claims priority, application Germany May 2, 1958
33 Claims. (Cl. 74—759)

The present invention relates to a change-speed transmission, especially for motor vehicles, provided with four forward speeds and a reverse speed, and essentially consists of a hydrodynamic device such as a hydrodynamic coupling, and of several planetary gear sets operatively connected behind the hydrodynamic device in the normal direction of the transmission of torque whereby the driven or turbine wheel of the hydrodynamic device is operatively connected with the two sun gears of two planetary gear sets which are connected for common rotation with each other while the sun gear of another planetary gear set is adapted to be selectively connected also with the driven or turbine wheel of the hydrodynamic device or with a relatively stationary part of the transmission such as the transmission housing.

Change-speed transmissions of the type mentioned hereinabove are known in the prior art in which four planetary gear sets are operatively connected behind the hydrodynamic device in the normal direction of the transmission of torque. In these prior art change-speed transmissions, the four forward speeds are obtained by means of the first three planetary gear sets, whereas the fourth planetary gear set is necessary for purposes of providing a reverse speed. The prior art constructions are, therefore, disadvantageous by reason of the length of the construction thereof necessitated by the four planetary gear sets and by reason of the requirement of the numerous shifting members necessitated therefor.

The present invention aims at an elimination of these disadvantages and provides a solution therefor in such a manner that for purposes of achieving the reverse speed with the same three planetary gear sets used also in connection with the four forward speeds, the driven or turbine wheel of the hydrodynamic device is adapted to be selectively connected by means of a disengageable device with the two sun gears rigidly connected with each other of two planetary gear sets, namely of the second and third planetary gear set, and the drive takes place over the other sun gear, namely of the first planetary gear set.

By the use of a construction in accordance with the present invention, it is possible to obtain the reverse speed with the same planetary gear sets as are used for the forward speeds. Consequently, one planetary gear set and the operating and actuating members necessary therefor may be dispensed with and are therefore, saved in a construction according to the present invention. As a result thereof, the transmission in accordance with the present invention has a considerably shorter dimension as regards the constructional length thereof and may be shifted also without changing groups of transmission elements, i.e. which may be shifted without changing the transmission ratio in two or more planetary gear sets in connection with a single change in speed by actuating the shifting elements at both planetary gear sets. In other words, the change-speed transmission according to the present invention provides four forward speeds by means of three groups of transmission elements, each group consisting of a planetary gear set and its associated engageable means, in which shifting from one to the next speed is achieved by substituting only one engageable means for one other previously engaged engageable means, such as a clutch or brake.

According to a further feature in accordance with the present invention, a particularly advantageous construction may be realized if the shaft operatively connected with the driven or turbine wheel of the hydrodynamic device passes over into an outer drum-shaped member or is operatively connected therewith, and if the two engageable means for selectively connecting the driven or turbine wheel of the hydrodynamic coupling with the sun gear of the first planetary gear set or with the two sun gears of the second and third planetary gear sets are arranged within this drum-shaped member.

Appropriately, the engageable means for operatively connecting the driven member of the hydrodynamic device with the two sun gears is constructed as a single friction-disk clutch and the engageable means for operatively connecting the driven member of the hydrodynamic device with the sun gear of the first planetary gear set as a multi-friction disk clutch whereby the drum-shaped member serves simultaneously as outer supports or carriers for the friction disks for both clutches and whereby a disk member disposed between the two engageable means or clutches and serving as abutment for the clutch adapted to provide a selective connection with the two interconnected sun gears is operatively connected therewith. The disk member simultaneously therewith may also form or accommodate therein the annular cylinder for the actuating piston of the clutch adapted to provide a selective connection with the sun gear of the first planetary gear set whereby this last-mentioned clutch abuts also against a further disk member serving as abutment and secured at the end of the drum-shaped member.

The inner support or carrier for the friction disks of the clutch adapted to provide a selective connection with the first sun gear simultaneously serves as inner support or carrier for the friction disks of an engageable means directly adjacent thereto for purposes of connecting the same sun gear with a relatively stationary part such as the transmission housing. A further engageable means for operatively connecting the ring gear of the second planetary gear set with the relatively stationary part such as the transmission housing is arranged directly adjacent to this last-mentioned engageable means and is disposed in a mirror-image-like manner with respect thereto. Both of these last-mentioned engageable means thereby support themselves against a disk member disposed therebetween and serving as abutment.

According to a further feature advantageous as regards the construction of the change-speed transmission in accordance with the present invention, the engageable means for the first sun gear and the engageable means for operatively connecting the ring gears of the other planetary gear sets with the stationary transmission housing are constructed as multi-friction-disk engageable devices and at least these multi-friction-disk engageable devices are arranged concentrically about the three planetary gear sets and consist of identical elements whereby, in consideration of the differing reaction moments which may occur within or have to be transmitted by the different engageable means, a different number of friction-disk members may be provided in the individual engageable means.

A simplification in the manufacture and assembly as well as also in the requirement for spare parts is obtained by the use of a construction in accordance with the present invention. The use of friction-disk engageable means offers essentially the advantage that no transverse forces can be caused and, therefore, no bending forces or stresses can occur in the bearings and shafts of the transmission in accordance with the present invention.

Accordingly, it is an object of the present invention to provide a change-speed transmission having at least four forward speeds and a reverse speed which makes possible the obtainment of these various speeds in a selective manner by the fewest possible parts.

Another object of the present invention is a change-speed transmission utilizing only three planetary gear sets to produce four forward speeds and a reverse speed.

Still another object of the present invention is the provision of a change-speed transmission in which four speeds are obtainable and in which the same gear elements or groups of gear elements are used for purposes of achieving the reverse speed as are used for purposes of obtaining the forward speeds.

Still another object of the present invention resides in the provision of a multi-speed change-speed transmission providing also a reverse speed which is simple in construction, relatively short in length and which obviates the needs for unnecessary actuating parts.

A still further object of the present invention is the provision of a four-speed change-speed transmission with a reverse speed which reduces the cost of manufacture thereof, facilitates assembly thereof, and which reduces the requirement for the number of individual spare parts necessary therefor.

Still another object of the present invention is the provision of a change-speed transmission having four forward speeds and a reverse speed in which engageable means are used of a type eliminating bending forces and moments in the bearings and shafts of the transmission.

These and other objects, features and advantages of the present invention will become more obvious from the following description when taken in connection with the accompanying drawing, which shows, for purposes of illustration only, one embodiment in accordance with the present invention, and wherein:

FIGURE 1 is a schematic diagram of the transmission in accordance with the present invention, and FIGURE 2 is a longitudinal, axial cross-sectional view through the upper half of a transmission in accordance with the present invention.

Referring now to the drawing, wherein like reference numerals are used throughout the two views to designate corresponding parts, reference numeral 10 generally designates a hydrodynamic device, such as a hydrodynamic coupling of which the driving or impeller member 8 is driven from the drive or input shaft 6 such as the engine crankshaft over the housing portion 7. The driving or impeller member 8 may thereby simultaneously form itself a portion of the housing.

While we have shown in our preferred embodiment a hydrodynamic coupling, it is understood that any hydrodynamic device, such as a torque converter or hydrodynamic coupling of any other suitable construction may be used in accordance with the present invention.

The change-speed transmission includes a planetary gear change-speed transmission section generally designated by reference numeral 11 which itself is formed by three planetary gear sets generally designated by reference numerals 12, 13 and 14. The mechanical change-speed transmission section 11 is accommodated within a separate housing 15 (FIGURE 2) which is flangedly connected to the housing 16 surrounding the hydrodynamic device 10. The driven or turbine wheel 17 of the hydrodynamic coupling 10 is operatively connected, in any suitable conventional manner, with a shaft 18 which passes over or is operatively connected, for example, by an intermediate member 20 with the outer drum-shaped member 19.

The drum-shaped member 19 serves as outer carrier or support for the friction disks of two friction disk clutches generally designated by reference numerals 21 and 22. A disk member 23 is disposed between the two friction disks 21 and 22 which is rigidly secured at the drum-shaped member 19. The disk member 23 serves as abutment for the clutch 21 which is constructed as a single friction disk clutch, the other clutch half of which is operatively connected with a shaft 25 by a connecting piece or member 24. The shaft 25 forms the sun gears 26 and 27 of the second and third planetary gear sets 13 and 14 or is connected operatively therewith for common rotation, for example, by a splined connection.

The clutch 22 is constructed as a multi-friction-disk clutch. One set of friction disks is thereby supported at the carrier 19 while the set of counter-friction disks is supported by another connecting piece 28, having, for example, an essentially Z-shaped cross section and operatively connected with the sun gear 29 of the first planetary gear set 12. The disk member 23 simultaneously forms or is operatively connected with the annular cylinder 30 for the actuating piston 31 of the clutch 22. A disk member 32 disposed at the right end of the drum-shaped member 19 as viewed in FIGURE 2 serves as abutment for clutch 22. The driven or turbine wheel 17 of the hydrodynamic coupling 10 in this manner is adapted to be selectively connected either over clutch 21 with both sun gears 26 and 27 of the second and third planetary gear sets 13 and 14 or over clutch 22 with the sun gear 29 of the first planetary gear set 12. Upon simultaneous engagement of both clutches 21 and 22, the driven or turbine wheel 17 is operatively connected with all three sun gears 29, 26 and 27 of the first, second and third planetary gear sets respectively.

An angularly bent or angle-member 33 is secured at the Z-shaped intermediate member 28 which itself serves for purposes of connection with the sun gear 29 of the first planetary gear set 12. The angularly-bent of angle-member 33 serves as inner support or carrier for the friction disks of a further engageable means generally designated by reference numeral 34 the outer friction disks of which are secured within the transmission housing 15 in any suitable manner, i.e., within a relative stationary part of the transmission. The engageable means 34 thereby serves for the selective connection of the sun gear 29 of the first planetary gear set 12 with the transmission housing 15.

A further engageable means generally designated by reference numeral 35 is arranged directly adjacent the engageable means 34 and in a mirror-image-like manner with respect thereto. The engageable means 35 serves for the selective connection of a connecting member 36 with the transmission housing 15 whereby the connecting member 36 operatively connects the ring gear 37 of the second planetary gear set 13 with the planet carrier 38 of the first planetary gear set 12.

A disk member 39 is disposed between the two engageable means 34 and 35 and serves as common abutment. The actuating pistons for the engageable means 34 and 35 are disposed axially outwardly thereof whereby one annular cylinder member 40 thereof simultaneously serves as abutment for the further engageable means 41 which is provided for the selective connection of the ring gear 42 of the third planetary gear set 14 with the transmission housing 15. Additionally, the ring gear 42 of the third planetary gear set is operatively connected with the planet carrier 43 of the second planetary gear set 13 and the ring gear 44 of the first planetary gear set. The actuating piston 45 for the engageable means 41 is arranged in an annular cylinder within the rear transmission wall. The driven or output shaft 47 is operatively connected with the planetary carrier 46 of the third planetary gear set 14 whereby the driven or output shaft may be operatively connected either directly or indirectly with the vehicle wheels. If it is desired to obtain additional speeds, it is only necessary to connect the transmission output shaft 47 with such additional change-speed transmission as is necessary to produce the additional desired speeds, such as an overdrive transmission or the like.

At least the engageable means 22, 34, 35 and 41 are arranged concentrically about the three planetary gear sets 12, 13 and 14 and are made up of identical elements. For purposes of properly taking into consideration the different reaction moments which occur at the individual planetary gear sets, different numbers of friction disks are provided in the respective engageable means. The single friction-disk clutch 21 may be made of different elements though a construction thereof utilizing similar structural elements is also possible therefore. For purposes of actuating the single friction disk clutch 21 an annular piston member 48 having a relatively large cross section is provided which is disposed within the drum-shaped member 19.

OPERATION

The operation of the change-speed transmission in accordance with the present invention is as follows:

In all four forward speeds the clutch 21 is engaged and therewith the sun gears 26 and 27 of the second and third planetary gear sets 13 and 14 are operatively connected with the transmission input shaft 18.

First Speed

For purposes of obtaining the first speed, the brake 41 is additionally engaged. The transmission of torque thereby takes place over the third planetary gear set 14 to the output shaft 47.

Second Speed

For purposes of obtaining the second speed, the brake 41 is disengaged and the brake 35 is engaged so that the torque is transmitted without changing any gear sets over the second and third planetary gear sets 13 and 14 to the output shaft 47.

Third Speed

In third speed, the brake 34 is engaged in the place of brake 35 which is now disengaged so that now all three planetary gear sets 12, 13 and 14 partake in the transmission of torque to the output shaft 47. As may be readily realized, the shifting from second to third also takes place without change in the groups or sets of transmission elements.

Fourth Speed

For purposes of obtaining fourth speed, the clutch 22 is engaged while the brake 34 is disengaged. As a result thereof, the sun gear 29 of the first planetary gear set 12 is also operatively connected with the transmission input shaft 18, i.e., with the drive and a direct speed in which all planetary gear sets 12, 13 and 14 are locked in themselves is thereby obtained.

Reverse Speed

For purposes of obtaining the reverse speed, the clutch 22 remains engaged whereas the clutch 21 is disengaged and the brake 41 is engaged instead. Consequently, for purposes of obtaining the reverse speed the same shifting elements are used as are already necessary anyhow for the forward speeds.

The following diagrammatic tabulation illustrating the engagement of the various clutches and brakes for the respective speeds is believed helpful in understanding the operation of the transmission in accordance with the present invention

| Speed | Clutches | | Brakes | | |
|---|---|---|---|---|---|
| | 21 | 22 | 34 | 35 | 41 |
| First | engaged | | | | engaged |
| Second | ---do--- | | | engaged | |
| Third | ---do--- | | engaged | | |
| Fourth | ---do--- | engaged | | | |
| Reverse | | ---do--- | | | Do. |

While we have shown and described one embodiment in accordance with the present invention it is understood that the same is not limited thereto but is susceptible of many changes and modifications within the spirit and scope of the present invention and we, therefore, do not wish to be limited to the details shown and described herein but intend to cover all such changes and modifications as are encompassed by the scope of the appended claims.

We claim:
1. A change-speed transmission, especially for motor vehicles, having four forward speeds and a reverse speed comprising transmission input means, transmission output means, three planetary gear sets operatively connected between said transmission input and output means and each including a first central gear, a second central gear, at least one planet gear meshing with a respective first and second central gear, and a planet carrier for said planet gear, two central gears of two different planetary gear sets being connected together for common rotation, said output means being operatively connected only with the planet carrier of only one of said planetary gear sets for rotation in unison therewith, and a plurality of engageable means operatively connected with and including only said three planetary gear sets for selectively obtaining said four forward speeds of said change-speed transmission and said reverse speed including means so interconnecting said three planetary gear sets with each other and with said engageable means that said four forward speeds are obtained by substituting only one engageable means for another previously engaged engageable means during each shifting operation from one to the next of said four forward speeds, and one of said engageable means selectively connecting said input means with said two central gears connected together for common rotation.

2. A change-speed transmission, especially for motor vehicles, having four forward speeds and a reverse speed comprising a hydrodynamic device including a driving member and a driven member, transmission input means operatively connected to said driven member, transmission output means, three planetary gear sets operatively connected between said transmission input and output means and each including a plurality of rotatable elements consisting of a first central gear, a second central gear, at least one planet gear meshing with a respective first and second central gear, and a planet carrier for said planet gear, two central gears of two different planetary gear sets being connected together for common rotation and one rotatable element of each of said three planetary gear sets other than said two last-mentioned central gears being operatively connected together for common rotation, said output means being operatively connected only with the planet carrier of only one of said planetary gear sets for rotation in unison therewith, and a plurality of engageable means operatively connected and including only said three planetary gear sets for selectively obtaining said four forward speeds of said change-speed transmission and said reverse speed including means so interconnecting said three planetary gear sets with each other and with said engageable means that said four forward speeds are obtained by substituting only one engageable means for another previously engaged engageable means during each shifting operation from one to the next of said four forward speeds.

3. A change-speed transmission, especially for motor vehicles, having four forward speeds and a reverse speed comprising transmission input means, transmission output means, only three planetary gear sets operatively connected between said transmission input and output means and each including a sun gear, a ring gear, at least one planet gear meshing with a respective sun and ring gear, and a planet carrier for said planet gear, two sun gears of two planetary gear sets being connected together for common rotation, and a plurality of engageable means operatively connected only with the transmission elements of said three planetary gear sets for selectively obtaining said four forward speeds of said change-speed transmission and said reverse speed thereof by substituting only one engageable means for a previously engaged engageable means during each shifting operation from one to the next of said four forward speeds, some of said engageable means being operative to selectively connect said input means with transmission elements of said three planetary gear sets.

4. A change-speed transmission, especially for motor vehicles, having four forward speeds and a reverse speed comprising a hydrodynamic coupling having a driving member and a driven member, transmission input means operatively connected with said driven member, transmission output means, only three planetary gear sets operatively connected between said transmission input and output means and each including a sun gear, a ring gear, at least one planet gear meshing with a respective sun and ring gear, and a planet carrier for said planet gear, two sun gears of two planetary gear sets being connected together for common rotation, and a plurality of engageable means operatively connected only with the transmission elements of said three planetary gear sets for selectively obtaining said four forward speeds of said change-speed transmission and said reverse speed thereof by substituting only one engageable means for another previously engaged engageable means during each shifting operation from one to the next of said four forward speeds, some of said engageable means being operative to selectively connect said input means with transmission elements of said three planetary gear sets.

5. A change-speed transmission, especially for motor vehicles, having four forward speeds and a reverse speed comprising transmission input means, transmission output means, three planetary gear sets operatively connected between said transmission input and output means and each including a sun gear, a ring gear, at least one planet gear meshing with a respective sun and ring gear, and a planet carrier, two gears of two planetary gear sets being connected together for common rotation, and a plurality of engageable means operatively connected only with the transmission elements of said three planetary gear sets for selectively obtaining said four forward speeds of said change-speed transmission by substituting only one engageable means for another previously engaged engageable means during each shifting operation from one to the next of said four forward speeds and for selectively obtaining said reverse speed including first engageable means for selectively connecting, in at least some of said forward speeds, said transmission input means with said two gears connected together for common rotation, and second engageable means for selectively connecting, in said reverse speed, a gear of said third planetary gear set with said transmission input means.

6. A change-speed transmission according to claim 5, further comprising hydrodynamic means having an input member and an output member, said output member being operatively connected with said transmission input means.

7. A change-speed transmission according to claim 5, wherein said two gears of said two planetary gear sets connected together for common rotation are sun gears.

8. A change-speed transmission according to claim 7, wherein said gear of said third gear set is a sun gear.

9. A change-speed transmission according to claim 5, wherein said gear of said third planetary gear set is a sun gear.

10. A change-speed transmission, especially for motor vehicles, having a relatively stationary transmission part and providing at least four forward speeds and a reverse speed comprising a plurality of planetary gear sets each having a first central gear, a second central gear, at least one planet gear in meshing engagement with said two central gears, and a planet carrier for said planet gear, two central gears of two planetary gear sets being connected together for common rotation, transmission input means, first engageable means for selectively connecting said transmission input means with the central gear of another planetary gear set, second engageable means selectively connecting said last-mentioned central gear with said relatively stationary transmission part, and means including said first and second engageable means and said two planetary gear sets and said another planetary gear set for selectively obtaining the four forward speeds and the reverse speed of said change-speed transmission including third engageable means selectively connecting said transmission input means with said two central gears operatively connected together for common rotation.

11. A change-speed transmission, especially for motor vehicles, having a relatively stationary transmission part and providing at least four fourward speeds and a reverse speed comprising a hydrodynamic device including a driving member and a driven member, a plurality of planetary gear sets each having a first central gear, a second central gear, at least one planet gear in meshing engagement with said two central gears, and a planet carrier for said planet gear, two central gears of two planetary gear sets being connected together for common rotation, transmission input means operatively connected with said driven member, first engageable means for selectively connecting said transmission input means with the central gear of another planetary gear set, second engageable means selectively connecting said last-mentioned central gear with said relatively stationary transmission part, and means including said first and second engageable means and said two planetary gear sets and said another planetary gear set for selectively obtaining the four forward speeds and the reverse speed of said change-speed transmission including third engageable means selectively connecting said transmission input means with said two central gears operatively connected together for common rotation.

12. A change-speed transmission, especially for motor vehicles, having a relatively stationary transmission part and providing at least four forward speeds and a reverse speed comprising a plurality of planetary gear sets each having at least one sun gear, a ring gear, a planet gear meshing with said sun and ring gear, and a planet carrier for said planet gear, two sun gears of two planetary gear sets being operatively connected together for common rotation, transmission input means, first engageable means for selectively connecting said transmission input means with the sun gear of another planetary gear set, second engageable means for selectively engaging said last-mentioned sun gear with said relatively stationary transmission part, third engaeable means for selectively connecting said transmission input means with said two sun gears together for common rotation, and means including said first, second and third engageable means and said two planetary gear sets and said another planetary gear set for selectively obtaining at least some of the forward speeds of said change-speed transmission, and further means for obtaining said reverse speed.

13. A change-speed transmission, especially for motor vehicles, having a relatively stationary transmission part and providing at least four forward speeds and a reverse speed comprising a plurality of planetary gear sets each having at least one sun gear, a ring gear, a planet gear meshing with said sun and ring gear, and a planet carrier for said planet gear, two sun gears of two planetary gear sets being operatively connected together for common rotation, transmission input means, first engageable means for selectively connecting said transmission input means with the sun gear of another planetary gear set, second engageable means for selectively engaging said last-mentioned sun gear with said relatively stationary transmission part, third engageable means for selectively connecting said transmission input means with said two sun gears connected together for common rotation, means including said first, second and third engageable means and said two planetary gear sets and said another planetary gear set for selectively obtaining the forward speeds of said change-speed transmission, and further means including said first engageable means selectively connecting said transmission input means with said sun gear of said another planetary gear set for obtaining said reverse speed.

14. A change-speed transmission, especially for motor vehicles, having a relatively stationary transmission part and providing at least four forward speeds and a reverse speed comprising hydrodynamic means having an input member and an output member, a plurality of planetary gear sets each having at least one sun gear, a ring gear, a planet gear meshing with said sun and ring gear, and a planet carrier for said planet gear, two sun gears of two planetary gear sets being operatively connected together for common rotation, transmission input means operatively connected with the output member of said hydrodynamic means, first engageable means for selectively connecting said transmission input means with the sun gear of another planetary gear set, second engageable means for selectively engaging said last-mentioned sun gear with said relatively stationary transmission part, third engageable means for selectively connecting said transmission input means with said two sun gears connected together for common rotation, means including said first, second and third engageable means and said two planetary gear sets and said another planetary gear set for selectively obtaining the forward speeds of said change-speed transmission, and further means including said first engageable means selectively connecting said transmission input means with said sun gear of said another planetary gear set for obtaining said reverse speed.

15. A change-speed transmission according to claim 14, wherein said input means includes a shaft member operatively connected at one end thereof with said output member of said hydrodynamic means, an outer drum-shaped member operatively connected with said shaft member, said first and third engageable means being arranged within said outer drum-shaped member.

16. A change-speed transmission according to claim 15, wherein said third engageable means is a single-friction-disc clutch and said first engageable means is a multi-friction-disc clutch, and wherein said outer drum-shaped member forms the support member for the friction discs of said first and third engageable means.

17. A change-speed transmission according to claim 16, further comprising a disc member operatively connected with said outer drum-shaped member disposed between said first and third engageable means and forming an abutment for said third engageable means.

18. A change-speed transmission according to claim 17, further comprising actuating means for said engageable means, and another disc member at the end of said outer drum-shaped member forming an abutment for said first engageable means, said first-mentioned disc member being so formed as to accommodate therein the actuating means for said third engageable means.

19. A change-speed transmission according to claim 18, wherein said first engageable means includes an inner support member for the friction discs thereof formed by an essentially Z-shaped intermediate member and an inner support member for the friction discs of said second engageable means operatively connected with said essentially Z-shaped member.

20. A change-speed transmission according to claim 19, wherein said means for selectively obtaining the forward speeds of said change-speed transmission includes fourth engageable means directly adjacent said second engageable means for selectively connecting the ring gear of one of said two first-mentioned planetary gear sets with said relatively stationary transmission part.

21. A change-speed transmission according to claim 20, wherein said second and fourth engageable means are arranged in a mirror-image-like manner, and further comprising a disc member arranged between said second and fourth engageable means and serving as common abutment therefor.

22. A change-speed transmission according to claim 21, wherein said second and fourth engageable means each include an annular actuating cylinder with an annular actuating piston member accommodated therein, said annular cylinder and piston members being arranged axially outwardly of said second and fourth engageable means.

23. A change-speed transmission according to claim 22, wherein said means for selectively obtaining the forward speeds of said change-speed transmission includes fifth engageable means for selectively connecting the ring gear of the other of said two first-mentioned planetary gear sets with said relatively stationary transmission part, the annular cylinder member for said fourth engageable means simultaneously serving as abutment for said fifth engageable means.

24. A change-speed transmission according to claim 23, wherein said relatively stationary transmission part is the transmission housing having a rear terminal transmission wall, said fifth engageable means including an annular cylinder member and an actuating piston member accommodated within said last-mentioned annular cylinder member, said last-mentioned annular cylinder member being formed by said rear terminal transmission wall.

25. A change-speed transmission according to claim 24, wherein said first, second, fourth and fifth engageable means are constructed as multi-friction-disc engageable devices concentrically arranged about said three planetary gear sets and made of identical elements, with only the number of friction discs varying in said last-mentioned engageable means to take into consideration the varying reaction moments to be transmitted by the respective engageable means.

26. A change-speed transmission according to claim 14, wherein said means for selectively obtaining the forward speeds of said change-speed transmission includes fourth engageable means directly adjacent said second engageable means for selectively connecting the ring gear of one of said two first-mentioned planetary gear sets with said relatively stationary transmission part.

27. A change-speed transmission according to claim 26, wherein said means for selectively obtaining the forward speeds of said change-speed transmission includes fifth engageable means for selectively connecting the ring gear of the other of said two first-mentioned planetary gear sets with said relatively stationary transmission part, said fourth engageable means having an annular cylinder member simultaneously serving as abutment for said fifth engageable means.

28. A change-speed transmission according to claim 27, wherein said first, second, fourth and fifth engageable means are constructed as multi-friction-disc engageable devices concentrically arranged about said three planetary gear sets and made of identical elements, with only the number of friction discs varying in said last-mentioned engageable means to take into consideration the varying reaction moments to be transmitted by the respective engageable means.

29. A change-speed transmission according to claim 5, wherein said plurality of engageable means include engageable brake means for selectively braking the ring gear of one of said two planetary gear sets, two gears of which are connected together for common rotation.

30. A change-speed transmission especially for motor vehicles, having four forward speeds and a reverse speed, comprising transmission input means, transmission output means, only three planetary gear sets operatively connected between said transmission input means and output means and each including a first central gear, a second central gear, at least one planet gear meshing with a respective first and second central gear and a planet carrier for said planet gear, two central gears of two different planetary gear sets being connected for common rotation, said output means being operatively connected only with the planet carrier of only one of said planetary gear sets for rotation in unison therewith, and a plurality of engageable means operatively connected with and including only said three planetary gear sets for selectively obtaining said four forward speeds of said change-speed transmission and said reverse speed, one of said engageable means being operative for selectively connecting a central gear of the third planetary gear set with said input means and another engageable means being operative to selectively connect said input means with said two interconnected central gears in at least some of the forward speeds of said transmission.

31. A change-speed transmission, especially for motor vehicles, having four forward speeds and a reverse speed, comprising a transmission input shaft, a transmission output shaft, three planetary gear sets operatively connected between said transmission input and output shafts and each including a sun gear, a ring gear, at least one planet gear meshing with a respective sun and ring gear, and a planet carrier for said planet gear, two sun gears of two planetary gear sets being connected together for common rotation, and a plurality of engageable means operatively connected only with the transmission elements of said three planetary gear sets for selectively obtaining said four forward speeds by said change-speed transmission and the reverse speed thereof, one of said engageable means selectively connecting said input shaft with the two connected sun gears of said two planetary gear sets and another engageable means selectively connecting said input shaft with the sun gear of the third planetary gear set.

32. A change-speed transmission, especially for motor vehicles, having four forward speeds and a reverse speed, comprising a transmission input shaft, a transmission output shaft, three planetary gear sets operatively connected between said transmission input and output shafts and each including a sun gear, a ring gear, at least one planet gear meshing with a respective sun and ring gear, and a planet carrier for said planet gear, first engageable means for selectively connecting the sun gear of said first planetary gear set with said input shaft, second engageable means for braking said last-mentioned sun gear, third engageable means for selectively connecting said input shaft with the connected sun gears of said second and third planetary gear set, said output shaft being operatively connected with the planet carrier of the third planetary gear set, fourth engageable means for selectively braking the planet carrier of said first planetary gear set and the ring gear of said second planetary gear set, and fifth engageable means for selectively braking the ring gears of said first and third planetary gear set and the planet carrier of said second planetary gear set.

33. A change-speed transmission according to claim 32, wherein all of said engageable means are of the friction disk type construction.

References Cited in the file of this patent
UNITED STATES PATENTS

| | | |
|---|---|---|
| 2,572,007 | Burtnett | Oct. 23, 1951 |
| 2,672,767 | Schneider | Mar. 23, 1954 |
| 2,736,215 | Swift | Feb. 28, 1956 |
| 2,892,365 | Winther | June 30, 1959 |
| 2,899,846 | Tuck | Aug. 18, 1959 |
| 2,930,258 | Flinn | Mar. 29, 1960 |
| 2,990,727 | Miller | July 4, 1961 |